(12) United States Patent
Jacobs et al.

(10) Patent No.: US 11,060,646 B2
(45) Date of Patent: *Jul. 13, 2021

(54) COUPLER

(71) Applicant: Cobalt Coupler Systems, LLC, Fort Collins, CO (US)

(72) Inventors: Jon Joseph Jacobs, Fort Collins, CO (US); Lonnie Joseph Jacobs, Fort Collins, CO (US); Robert Wayne Noyer, Carr, CO (US); Lloyd Dale Seaton, Windsor, CO (US)

(73) Assignee: Cobalt Coupler Systems, LLC, Fort Collins, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/490,691

(22) Filed: Apr. 18, 2017

(65) Prior Publication Data

US 2018/0299052 A1    Oct. 18, 2018

(51) Int. Cl.
*F16L 37/091*    (2006.01)

(52) U.S. Cl.
CPC ................... *F16L 37/091* (2013.01)

(58) Field of Classification Search
CPC ......... F16L 37/091; F16L 37/08; F16L 21/08; F16L 37/02
USPC ................... 285/45, 340, 369, 374
See application file for complete search history.

(56) References Cited

U.S. PATENT DOCUMENTS

| 796,580 | A | 8/1905 | Johnston |
|---|---|---|---|
| 1,949,451 | A | 3/1934 | Brulatour |
| 2,201,372 | A | 5/1940 | Miller |
| 2,980,449 | A | 4/1961 | Dunton |
| 3,425,717 | A | 2/1969 | Bruce |
| 3,592,481 | A | 7/1971 | Jeffrey et al. |
| 4,054,306 | A | 10/1977 | Sadoff, Jr. et al. |
| 4,613,172 | A | 9/1986 | Schattmaier |
| 5,160,179 | A | 11/1992 | Takagi |

(Continued)

FOREIGN PATENT DOCUMENTS

| CA | 2532119 | 1/2005 |
|---|---|---|
| DE | 2609576 A1 | 11/1976 |

(Continued)

OTHER PUBLICATIONS

PCT International Patent Application No. PCT/US18/26587; International Search Report and Written Opinion of the International Searching Authority dated Jul. 26, 2018, 27 pages.

(Continued)

*Primary Examiner* — Matthew Troutman
*Assistant Examiner* — James A Linford
(74) *Attorney, Agent, or Firm* — Craig R. Miles; CR Miles P.C.

(57) ABSTRACT

A coupler including a tubular conduit having a length disposed between a first end and a second end and a thickness disposed between an external surface and internal surface defining an interior passage and including one or more of an external annular groove disposed in the external surface overlaying an internal annular member disposed on the internal surface, and one or more external annular members disposed on the external surface correspondingly overlaying one or more internal annular grooves disposed in said internal surface.

17 Claims, 12 Drawing Sheets

(56) References Cited

U.S. PATENT DOCUMENTS

| | | |
|---|---|---|
| 5,553,895 A | 9/1996 | Karl et al. |
| 5,722,702 A | 3/1998 | Washburn |
| 5,769,460 A | 6/1998 | Imai |
| 6,499,771 B1 | 12/2002 | Snyder, Sr. et al. |
| 6,502,865 B1 | 1/2003 | Steele |
| 6,663,145 B1 | 12/2003 | Lyall, III et al. |
| 6,719,330 B2 | 4/2004 | Brown et al. |
| 6,805,383 B2 | 10/2004 | Ostrander et al. |
| 6,851,446 B2 | 2/2005 | van der Meijden et al. |
| 6,913,292 B2 | 7/2005 | Snyder, Sr. et al. |
| 6,964,436 B2 | 11/2005 | Le Quere |
| 7,121,593 B2 | 10/2006 | Snyder, Sr. et al. |
| 7,344,166 B2 | 3/2008 | Ketcham et al. |
| 7,467,813 B2 | 12/2008 | Gunderson |
| 7,500,699 B2 | 3/2009 | Snyder, Sr. et al. |
| 7,748,754 B2 | 7/2010 | Snijders et al. |
| 7,866,707 B2 | 1/2011 | Sudar |
| 7,891,380 B2 | 2/2011 | Gunderson |
| 7,914,051 B2 | 3/2011 | Stoll et al. |
| 7,950,701 B2 | 5/2011 | Dole et al. |
| 8,052,406 B2 | 11/2011 | Li et al. |
| 8,091,932 B2 | 1/2012 | Nijsen |
| 8,177,263 B2 | 5/2012 | Dole et al. |
| 8,312,616 B2 | 11/2012 | Dole et al. |
| 8,317,202 B2 | 11/2012 | Rode et al. |
| 8,342,579 B2 | 1/2013 | Hennemann et al. |
| 8,516,678 B2 | 8/2013 | Hennemann et al. |
| 8,517,430 B2 | 8/2013 | Dole et al. |
| 8,556,302 B2 | 10/2013 | Dole |
| 8,607,431 B2 | 12/2013 | Rode et al. |
| 8,662,557 B2 | 3/2014 | Rode et al. |
| 8,801,048 B2 | 8/2014 | Morris et al. |
| 8,814,219 B2 | 8/2014 | Hennemann et al. |
| RE45,304 E | 12/2014 | Dole et al. |
| 8,925,176 B2 | 1/2015 | Choi et al. |
| 8,979,138 B2 | 3/2015 | Dole et al. |
| 9,016,746 B2 | 4/2015 | Rode et al. |
| D731,627 S | 6/2015 | Guest |
| 9,121,535 B2 | 9/2015 | Ammon et al. |
| 9,150,226 B2 | 10/2015 | Rode et al. |
| D761,892 S | 7/2016 | McCarty et al. |
| 9,388,922 B2 | 7/2016 | Dole |
| 9,523,454 B2 | 12/2016 | Schutte et al. |
| 9,568,127 B2 | 2/2017 | Morris et al. |
| 2004/0239115 A1 | 12/2004 | Wilk, Jr. et al. |
| 2005/0040650 A1 | 2/2005 | Chang |
| 2005/0146133 A1 | 7/2005 | Snyder, Sr. et al. |
| 2005/0173923 A1 | 8/2005 | Ketcham et al. |
| 2006/0022454 A1 | 2/2006 | Le Clinche et al. |
| 2006/0265852 A1 | 11/2006 | Snyder, Sr. et al. |
| 2008/0111369 A1 | 5/2008 | Pettinaroli |
| 2008/0185838 A1 | 8/2008 | Sudar |
| 2008/0191481 A1 | 8/2008 | Hartmann |
| 2008/0203723 A1 | 8/2008 | Cellemme |
| 2009/0001712 A1 | 1/2009 | Webb et al. |
| 2009/0032170 A1 | 2/2009 | Williams |
| 2009/0194990 A1 | 8/2009 | Williams |
| 2010/0194098 A1 | 8/2010 | Hennemann et al. |
| 2010/0194104 A1 | 8/2010 | Hennemann et al. |
| 2011/0214886 A1 | 9/2011 | Orr |
| 2012/0211209 A1 | 8/2012 | Choi et al. |
| 2013/0154260 A1* | 6/2013 | Jamison .......... F16L 21/02 285/374 |
| 2015/0276099 A1* | 10/2015 | Weissmann ...... F16L 13/116 285/179 |
| 2015/0285420 A1 | 10/2015 | Stout et al. |

FOREIGN PATENT DOCUMENTS

| | | |
|---|---|---|
| DE | 10335511 A1 | 10/2004 |
| DE | 102007054025 | 5/2009 |
| DE | 202011101106 | 8/2012 |
| EP | 241656 A1 * | 10/1987 |
| EP | 2677225 A2 | 12/2013 |
| EP | 3139076 A1 | 3/2017 |
| FR | 2747453 A1 | 10/1997 |
| FR | 2777341 A1 | 10/1999 |
| FR | 3001023 A1 | 7/2014 |
| GB | 1 372 241 A | 10/1974 |
| WO | 2008144332 A1 | 11/2008 |
| WO | 2014144026 A2 | 9/2014 |

OTHER PUBLICATIONS

Arnco Corporation. Shur-Lock™ II Couplers. Product Bulletin, dated May 2006, 1 page.

Daemar Inc. Self-Locking Retaining Rings. http://daemar.com, downloaded May 15, 2017, total 2 pages.

Traceparts. 3D models ANSI_ASME Inch _ Countersunk External Tooth-Lock Washers—Type B, https://www.tracepartsonline.net, downloaded May 15, 2017, total 2 pages.

U.S. Appl. No. 15/678,015; Office Action dated Feb. 4, 2019.
U.S. Appl. No. 15/678,015; Office Action dated Mar. 3, 2020.
U.S. Appl. No. 16/109,641; Office Action dated Mar. 16, 2021.
U.S. Appl. No. 15/678,015; Office Action dated Aug. 18, 2020.
European Patent Application No. 18787932.5; Extended European Search Report, dated Jan. 20, 2021, 10 pages.

* cited by examiner

COUPLER

I. FIELD OF THE INVENTION

A coupler including a tubular conduit having a length disposed between a first end and a second end and a thickness disposed between an external surface and internal surface defining an interior passage and including one or more of an external annular groove disposed in the external surface overlaying an internal annular member disposed on the internal surface, and one or more external annular members disposed on the external surface correspondingly overlaying one or more internal annular grooves disposed in said internal surface.

II. SUMMARY OF THE INVENTION

Accordingly, a broad object of the invention can be to provide a coupler including one or more of a tubular conduit having a length disposed between a first end and a second end, a conduit wall having a thickness disposed between an internal surface and an external surface, and an interior passage, and including one or more of an external annular groove circumferentially disposed on the external surface overlaying an internal annular member circumferentially disposed on the internal surface proximate the second end, and a first and second external annular member circumferentially disposed on the external surface overlaying a corresponding first and second internal annular groove circumferentially disposed on the internal surface in axial spaced apart relation on the external surface proximate the first end, where the first external annular member overlaying the first internal annular groove disposed a lesser distance from the first end than the second external annular member overlaying the second internal annular groove. A seal element can further be disposed in the first internal annular groove, where a portion of the seal element can extend outward into the interior space. Further, an annular retaining member can be disposed in the second internal annular member, where the annular retaining member can include a plurality of radially extending slots in circumferentially spaced apart relation to define a plurality of resiliently flexible tabs.

Another broad object of the invention can be to provide a coupler including one or more of a tubular conduit having a length disposed between a first end and second end, a conduit wall having a thickness disposed between an internal surface and an external surface, and an interior passage, and including one or more of an external annular groove circumferentially medially disposed on the external surface overlaying an internal annular member circumferentially disposed on the internal surface, a first and second external annular member circumferentially disposed on the external surface overlaying a corresponding first and second internal annular groove circumferentially disposed on the internal surface in axial spaced apart relation on the external surface proximate the first end, where the first external annular member overlaying the first internal annular groove disposed a lesser distance from the first end than the second external annular member overlaying the second internal annular groove, and a third and fourth external annular member circumferentially disposed on the external surface overlaying a corresponding third and fourth internal annular groove circumferentially disposed on the internal surface in axial spaced apart relation on the external surface proximate the second end, where the third external annular member overlaying the third internal annular groove disposed a lesser distance from the second end than the fourth external annular member overlaying the fourth internal annular groove. A first and second seal element can further be disposed in the first and third internal annular grooves, where a portion of each seal element can extend outward into the interior space. Further, a first and second annular retaining member can be disposed in the second, fourth, or both the second and fourth internal annular members, where each of the annular retaining members can include a plurality of radially extending slots in circumferentially spaced apart relation to define a plurality of resiliently flexible tabs.

Naturally, further objects of the invention are disclosed throughout other areas of the specification, drawings, photographs, and claims.

IV. DETAILED DESCRIPTION OF THE INVENTION

Generally referring to FIGS. 1 through 10, embodiments of a coupler (1) can include a tubular conduit (2) having a length (7) disposed between a first end (8) and a second end (9) and a thickness (11) disposed between an external surface (12) and an internal surface (13) defining an interior passage (14). As to particular embodiments, the coupler can, but need not necessarily include, one or more of an external annular groove (23) disposed in the external surface (12)

overlaying an internal annular member (4) disposed on the internal surface (13), and one or more external annular members (5) disposed on the external surface (12) correspondingly overlaying one or more internal annular grooves (3) disposed in said internal surface (13).

The tubular conduit (2) can have a length (7) disposed between a first end (8) and a second end (9) of between about 6.5 inches (165.1 millimeters) to about 8.5 inches (215.9 millimeters). In further particular embodiments, the length (7) of the tubular conduit (2) can be selected from the group including or consisting of about 6.6 inches to about 6.8 inches, about 6.7 inches to about 6.9 inches, about 6.8 inches to about 7.0 inches, about 6.9 inches to about 7.1 inches, about 7.0 inches to about 7.2 inches, about 7.1 inches to about 7.3 inches, about 7.2 inches to about 7.4 inches, about 7.3 inches to about 7.5 inches, about 7.4 inches to about 7.6 inches, about 7.5 inches to about 7.7 inches, about 7.6 inches to about 7.8 inches, about 7.7 inches to about 7.9 inches, about 7.8 inches to about 8.0 inches, about 7.9 inches to about 8.1 inches, about 8.0 inches to about 8.2 inches, about 8.1 inches to about 8.3 inches, about 8.2 inches to about 8.4 inches, and combinations thereof.

The tubular conduit (2) can include a conduit wall (10) having a thickness (11) disposed between an external surface (12) and an internal surface (13). The internal surface (13), external surface (12), or both can have the same or different surface roughnesses or surface finishes. The internal surface (13) of the tubular conduit (2) can define an interior passage (14) communicating between the first and second ends (8)(9). In particular embodiments, as shown in the examples of FIGS. 4, 5, 9, and 10, the tubular conduit (2) can, but need not necessarily, have a generally cylindrical internal surface (15). The thickness (11) of the conduit wall (10) can be about 0.15 inches (3.81 millimeters) to about 0.35 inches (8.89 millimeters). In further particular embodiments, the thickness (11) of the conduit wall (10) can be selected from the group including or consisting of about 0.16 inches to about 0.2 inches, about 0.175 inches to about 0.225 inches, about 0.2 inches to about 0.25 inches, about 0.225 inches to about 0.275 inches, about 0.25 inches to about 0.3 inches, about 0.275 inches to about 0.325 inches, about 0.3 inches to about 0.34 inches, and combinations thereof.

The interior passage (14) can have a diameter (16) of about ½ inch (12.7 millimeters) to about 4½ inches (114.3 millimeters). In further particular embodiments, the diameter (16) can be selected from the group including or consisting of: about ¾ inch to about 1¼ inches, about 1 inch to about 1½ inches, about 1¼ inches to about 1¾ inches, about 1½ inches to about 2 inches, about 1¾ inches to about 2¼ inches, about 2 inches to about 2½ inches, about 2¼ inches to about 2¾ inches, about 2½ inches to about 3 inches, about 2¾ inches to about 3¼ inches, about 3 inches to about 3½ inches, about 3/14 inches to about 3¾ inches, about 3½ inches to about 4 inches, about 3¾ inches to about 4¼ inches, and combinations thereof.

In particular embodiments, the tubular conduit (2) can be produced from a material selected from the group including or consisting of: polyvinyl chloride, copper, concrete, acrylonitrile butadiene styrene, polyethylene, and combinations thereof.

Now referring to FIGS. 1 through 5, particular embodiments of a coupler (1) can, but need not necessarily, include a first external annular member (17) circumferentially disposed on the external surface (12). As to particular embodiments, a second external annular member (17)(18) can be circumferentially disposed on the external surface (12) of the tubular conduit (2). In particular embodiments, the first external annular member (17) can overlay a first internal annular groove (25) circumferentially disposed in the internal surface (13) of the tubular conduit (2). As to particular embodiments, a first and second external annular member (17) (18) can correspondingly overlay a first and second internal annular groove (25)(26) circumferentially disposed in axial spaced apart relation on the internal surface (13) of the tubular conduit (2). In particular embodiments, the first external annular member (17) overlaying the first internal annular groove (25) and the second external annular member (26) overlaying the second internal annular groove (26) can further be disposed in axial spaced apart relation on the external surface (12) of the tubular conduit (2) proximate the first end (8). In further particular embodiments, the first external annular member (17) overlaying the first internal annular groove (25) can be disposed a lesser distance from the first end (8) than the second external annular member (18) overlaying the second internal annular groove (26).

In particular embodiments, each of the first and second external annular members (17)(18) can be configured to have a crown (19) extending outward from the external surface (12). Each side (20) of a respective crown (19) of the first and second external annular members (17)(18) can, but need not necessarily, taper towards the external surface (12), where the width (21) of the crown (19) can be substantially equal to a width (23) of the corresponding first or second internal annular grooves (26)(27). In other particular embodiments, each side (20) of a respective crown (19) of the first and second external annular members (17)(18) can, but need not necessarily, be orthogonal to the external surface (12). The height (22) of the crown (19) of the first and second external annular members (17)(18) can be between about 1.0 times and about 2.0 times that of the depth (24) of the corresponding first and second internal annular grooves (25)(26).

Figure 1:
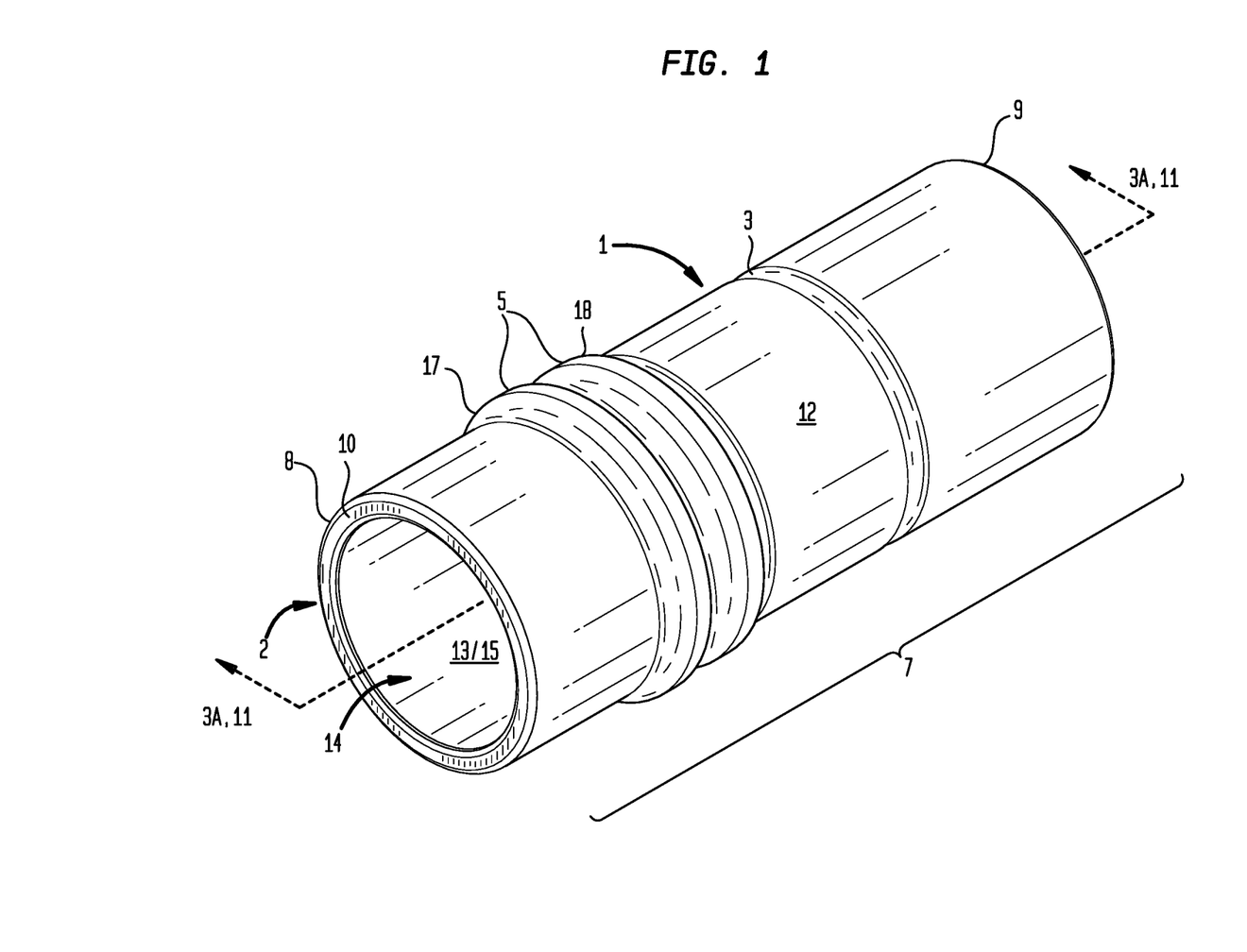
FIG. 1 is a perspective view of a particular embodiment of a coupler.
Figure 2:
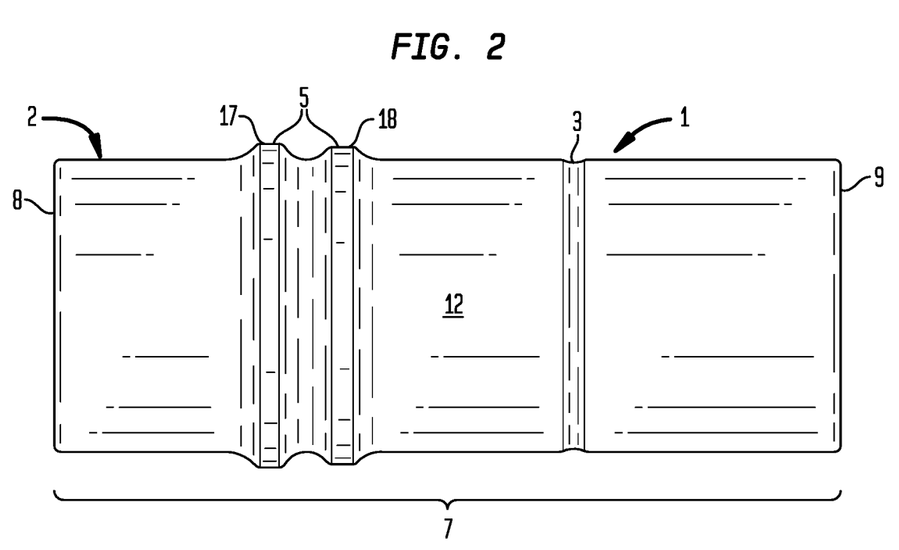
FIG. 2 is a side view of a particular embodiment of a coupler.
Figure 3A:
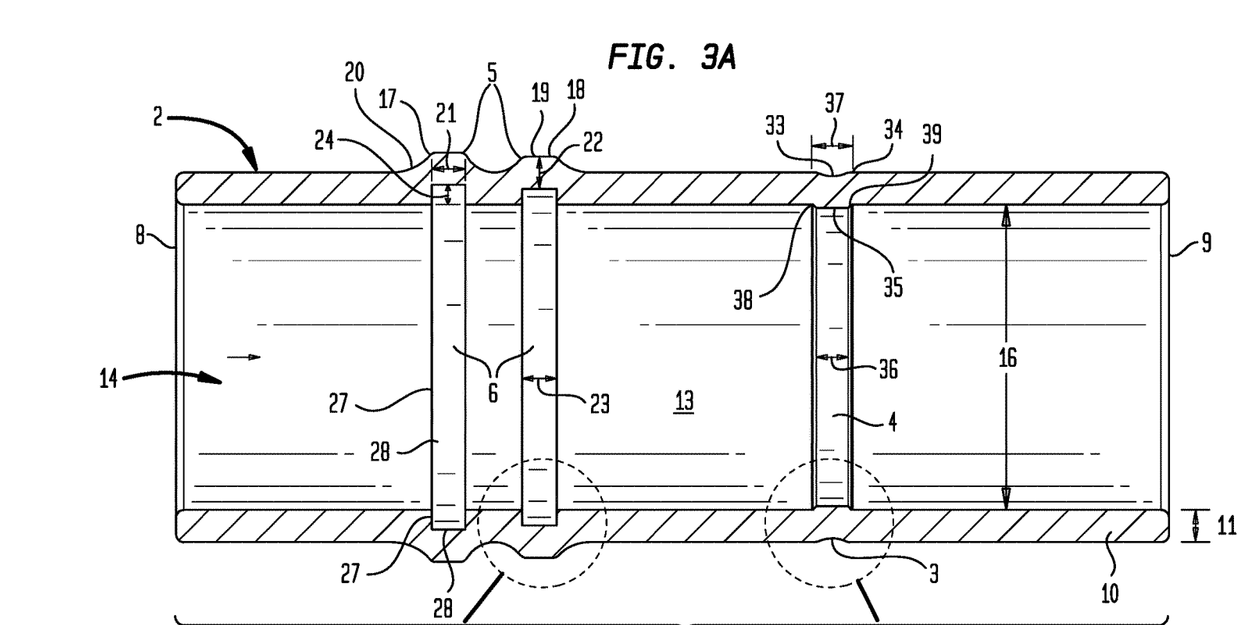
FIG. 3A is a cross sectional view 3A-3A of the particular embodiment of the coupler shown in FIG. 1.
Figure 3B:
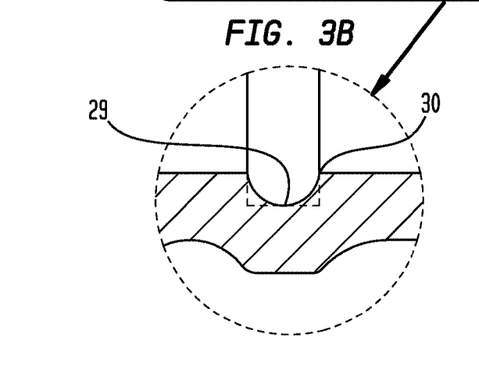
FIG. 3B is an enlarged portion of the cross sectional view 3A-3A.
Figure 3C:
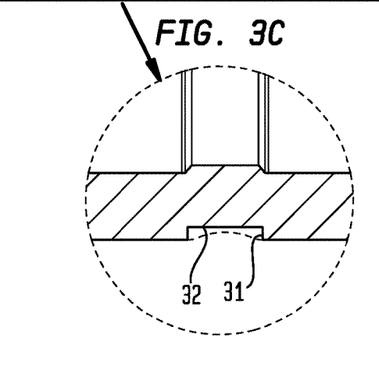
FIG. 3C is another enlarged portion of the cross sectional view 3A-3A.
Figure 4:
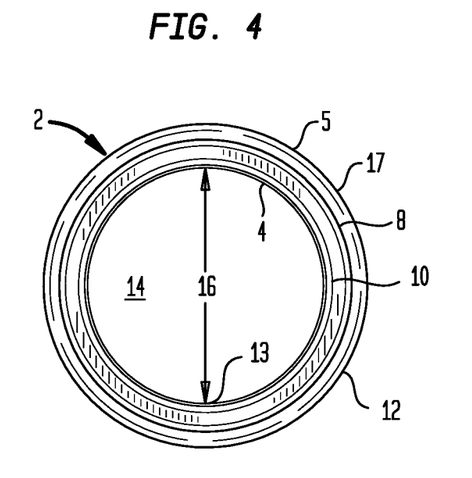
FIG. 4 is a first end view of a particular embodiment of a coupler.
Figure 5:
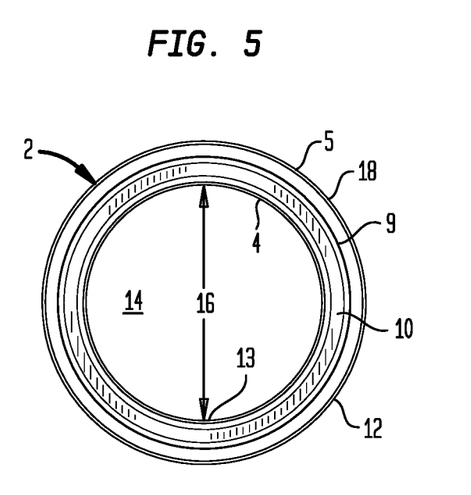
FIG. 5 is a second end view of a particular embodiment of a coupler.
Figure 6:
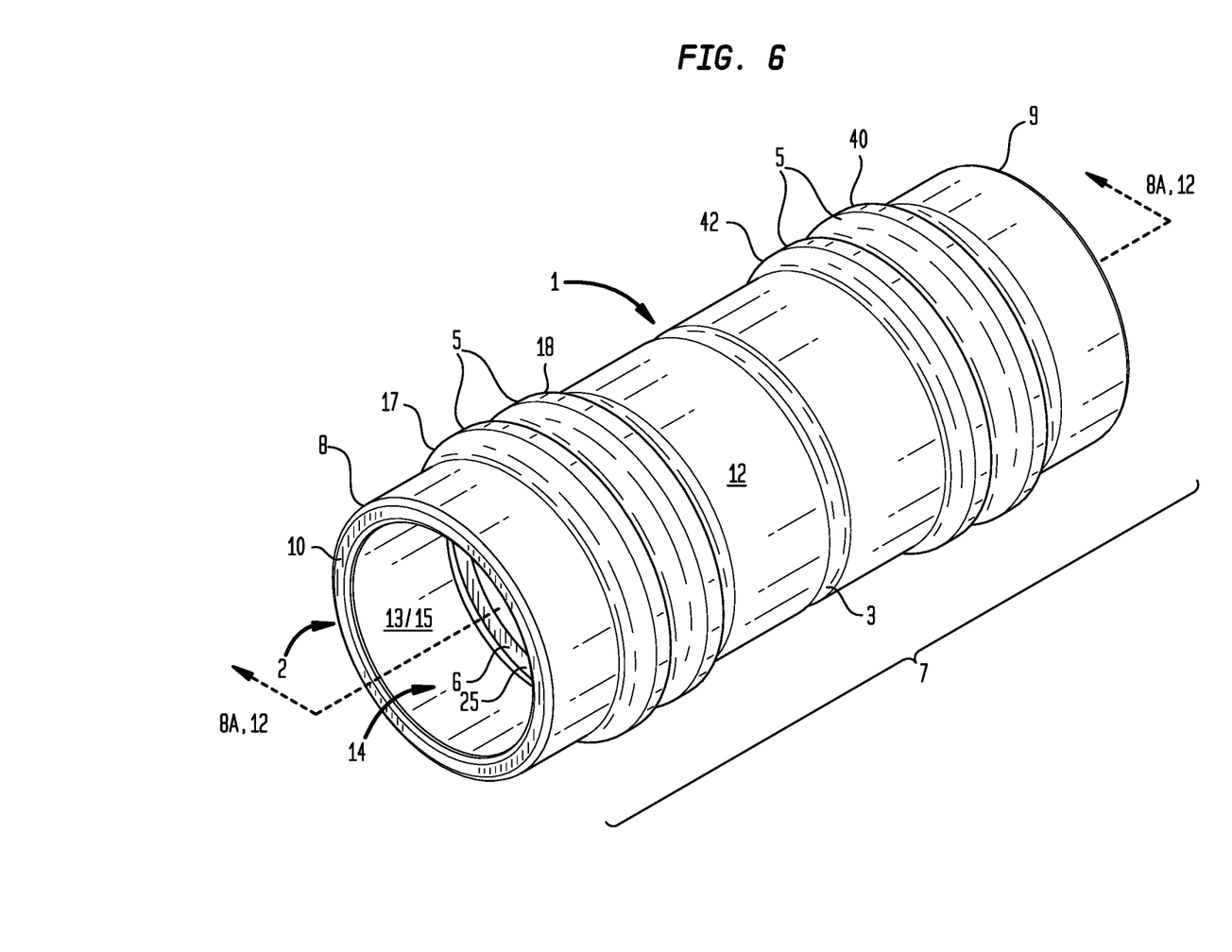
FIG. 6 is a perspective of another particular embodiment of a coupler.
Figure 7:
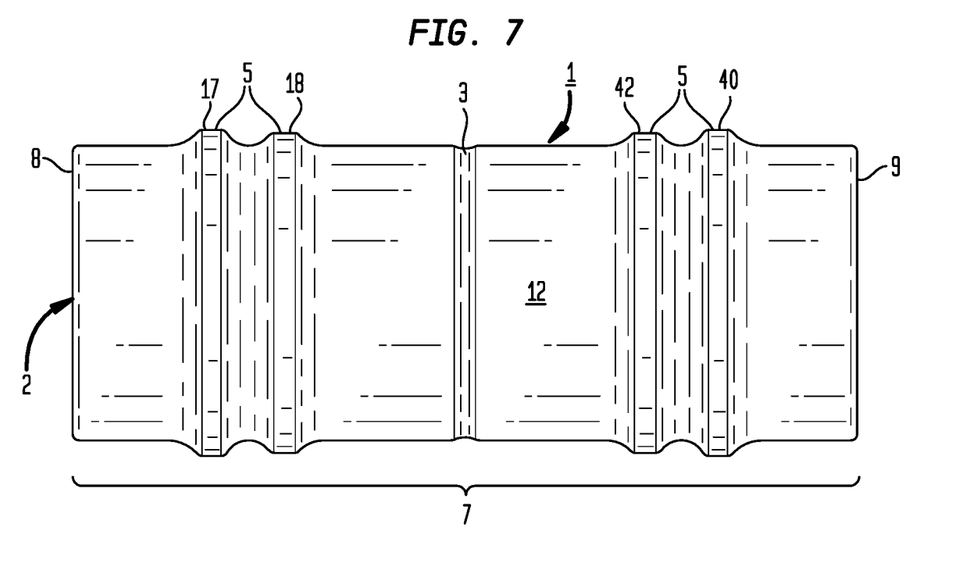
FIG. 7 is a side view of another particular embodiment of a coupler.
Figure 8A:
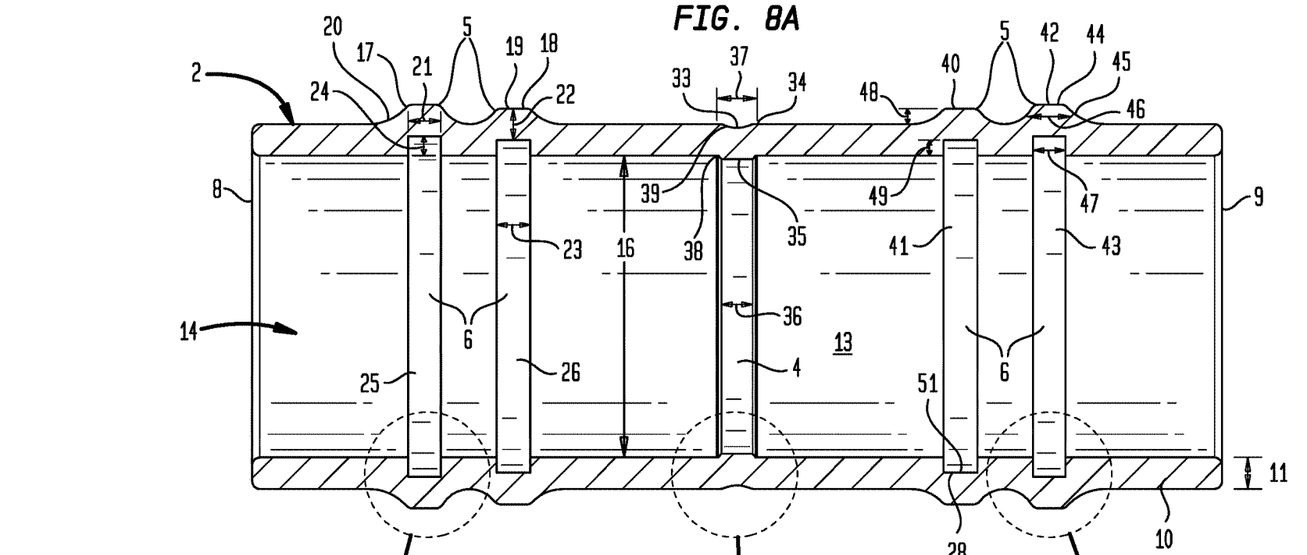
FIG. 8A is a cross sectional view 8A-8A of the particular embodiment of the coupler shown in FIG. 6.
Figure 8B:
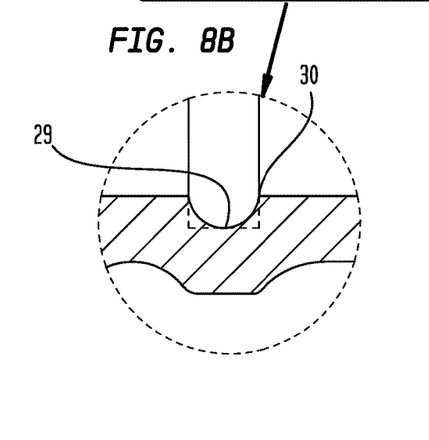
FIG. 8B is an enlarged portion of the cross sectional view 8A-8A.
Figure 8C:
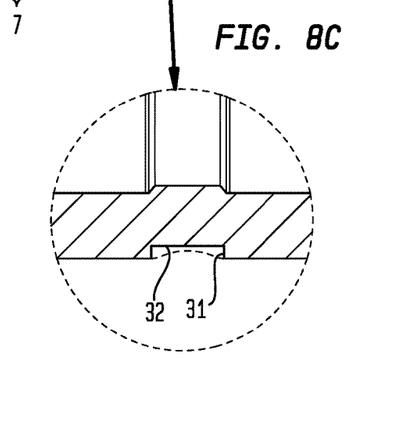
FIG. 8C is another enlarged portion of the cross sectional view 8A-8A.
Figure 8D:
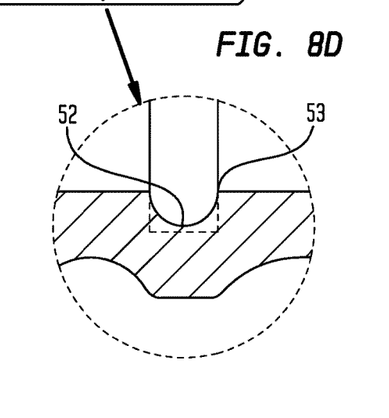
FIG. 8D is another enlarged portion of the cross sectional view 8A-8A.
Figure 9:
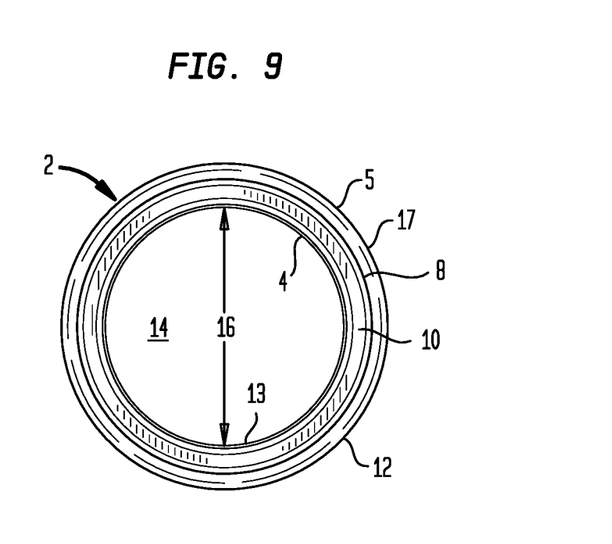
FIG. 9 is a first end view of another particular embodiment of a coupler.
Figure 10:
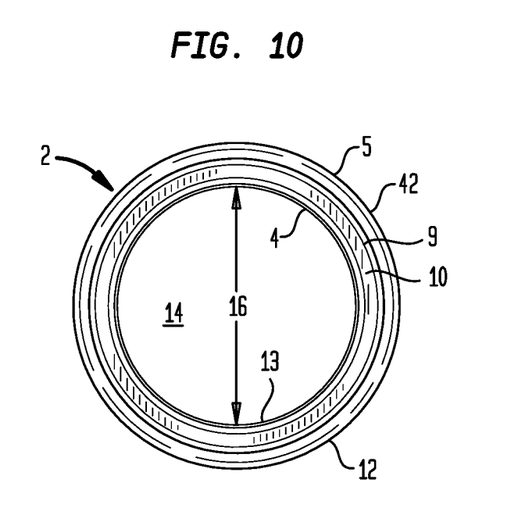
FIG. 10 is a second view of another particular embodiment of a coupler.

In particular embodiments, each of the first and second internal annular grooves (25)(26) can, but need not necessarily, be configured to have two sides (27) orthogonal to the bottom (28) of each of the respective first and second internal annular grooves (25)(26), as exemplified in FIGS. 3A and 8A. In further particular embodiments, each of the first and second internal annular grooves (25)(26) can, but need not necessarily be configured as a single arcuate bottom (29) disposed between the edges (30) of the respective first and second internal annular grooves (25)(26), as exemplified in FIGS. 3B and 8B.

In further particular embodiments of a coupler (1), an external annular groove (3) can be circumferentially disposed on the external surface (12) of the tubular conduit (2) and overlay an internal annular member (4) circumferentially disposed on the internal surface (13) of the tubular conduit (2). The external annular groove (3) can, but need not necessarily, be configured to have two sides (31) orthogonal to a bottom (32) of the external annular groove (3), as exemplified in FIGS. 3C and 8C. In further particular embodiments, the external annular groove (3) can, but need not necessarily, be configured as a single arcuate bottom (33) disposed between the edges (34) of the external annular groove (3), as exemplified in FIGS. 3A and 8A. In particular embodiments, the internal annular member (4) can be configured to have a crown (35) extending outward from the internal surface (13) into the interior passage (14). Each side of the crown (35) can, but need not necessarily, taper towards the internal surface (13) where the width (36) of the crown (35) can be substantially equal to the width (37) of the external annular groove (3). In other particular embodiments, each side of the crown (35) of the internal annular member (4) can, but need not necessarily, be orthogonal to the internal surface (13). The height (38) of the crown (35) of the internal annular member (4) can be between about 1.0 times and about 2.0 times that of the depth (39) of the external annular groove (3). The external annular groove (3) overlaying the internal annular member (4) can further, but need not necessarily, be disposed proximate the second end (9) of the tubular conduit (2).

The internal surface (13) of the tubular conduit (2), in particular embodiments, can further be configured to taper as the internal surface (13) approaches the first internal annular groove (25) from the first end (8) of the tubular conduit (2). The internal surface (13) can taper about 0.01 inches (0.254 millimeters) to about 0.03 inches (0.762 millimeters) between the first end (8) and the first internal annular groove (25). In further particular embodiments, the taper of the internal surface (13) between the first end (8) and the first internal annular groove (25) can be selected from the group including or consisting of: about 0.012 inches to about 0.014 inches, about 0.013 inches to about 0.015 inches, about 0.014 inches to about 0.016 inches, about 0.015 inches to about 0.017 inches, about 0.016 inches to about 0.018 inches, about 0.017 inches to about 0.019 inches, about 0.018 inches to about 0.020 inches, about 0.019 inches to about 0.021 inches, about 0.020 inches to about 0.022 inches, about 0.021 inches to about 0.023 inches, about 0.022 inches to about 0.024 inches, about 0.023 inches to about 0.025 inches, about 0.024 inches to about 0.026 inches, about 0.025 inches to about 0.027 inches, about 0.026 inches to about 0.028 inches, about 0.027 inches to about 0.029 inches, and combinations thereof.

Referring generally to FIGS. 6 through 10, particular embodiments of a coupler (1) can further include a third external annular member (40) circumferentially disposed on the external surface (12) of the tubular conduit (2) and overlaying a third internal annular groove (41) circumferentially disposed in the internal surface (13) of the tubular conduit (2). Additionally, a fourth external annular member (42) can be circumferentially disposed on the external surface (12) of the tubular conduit (2) and overlaying a fourth internal annular groove (43) circumferentially disposed in the internal surface (13) of the tubular conduit (2). The third and fourth external annular members (40)(42) correspondingly overlaying the third and fourth internal annular grooves (41)(43) can be disposed in axial spaced apart relation on the external surface (12) of the tubular conduit (2) proximate the second end (9). The third external annular member (40) overlaying the third internal annular groove (41) can be disposed a lesser distance from the second end (9) than the fourth external annular member (42) overlaying the fourth internal annular groove (43). In particular embodiments, the external annular groove (3) overlaying the internal annular member (4) can be medially disposed on the tubular conduit (2).

In particular embodiments, each of the third and fourth external annular members (40)(42) can have a crown (44) extending outward from the external surface (12). Each side (45) of a respective crown (44) of the third and fourth external annular members (40)(42) can, but need not necessarily, taper towards the external surface (12), where the width (46) of the crown (44) can be substantially equal to a width (47) of the corresponding third and fourth internal annular groove (41)(43). In other particular embodiments, each side (45) of a respective crown (44) of the third and fourth external annular members (40)(42) can, but need not necessarily, be orthogonal to the external surface (12). The height (48) of the crown (44) of the third and fourth external annular members (40)(42) can be between about 1.0 times and about 2.0 times that of the depth (49) of the corresponding third and fourth internal annular grooves (41)(43).

In particular embodiments, each of the third and fourth internal annular grooves (41)(43) can, but need not necessarily, have two sides (50) orthogonally joined to the bottom (51) of each of the respective third and fourth internal annular grooves (41)(43), as exemplified in FIG. 8A. In further particular embodiments, each of the third and fourth internal grooves (41)(43) can, but need not necessarily be configured as a single arcuate bottom (52) disposed between the edges (53) of the respective third and fourth internal grooves (41)(43), as exemplified in FIG. 8D.

In particular embodiments, the first internal annular groove (25), the second internal annular groove (26), the third internal annular groove (41), the fourth annular groove (43), and the external annular groove (3) can each have a depth (24)(39) of about 0.1 inches (2.54 millimeters) to about 0.3 inches (7.62 millimeters). In further particular embodiments, the depth (24) of the first internal annular groove (25), the second internal annular groove (41), the third annular groove (43), the fourth internal annular groove (26), and the external annular groove (3) can be selected from the group including or consisting of: about 0.12 inches to about 0.14 inches, about 0.13 inches to about 0.15 inches, about 0.14 inches to about 0.16 inches, about 0.15 inches to about 0.17 inches, about 0.16 inches to about 0.18 inches, about 0.17 inches to about 0.19 inches, about 0.18 inches to about 0.2 inches, about 0.19 inches to about 0.21 inches, about 0.2 inches to about 0.22 inches, about 0.21 inches to about 0.23 inches, about 0.22 inches to about 0.24 inches, about 0.23 inches to about 0.25 inches, about 0.24 inches to about 0.26 inches, about 0.25 inches to about 0.27 inches, about 0.26 inches to about 0.28 inches, about 0.27 inches to about 0.29 inches, and combinations thereof.

Figure 11:
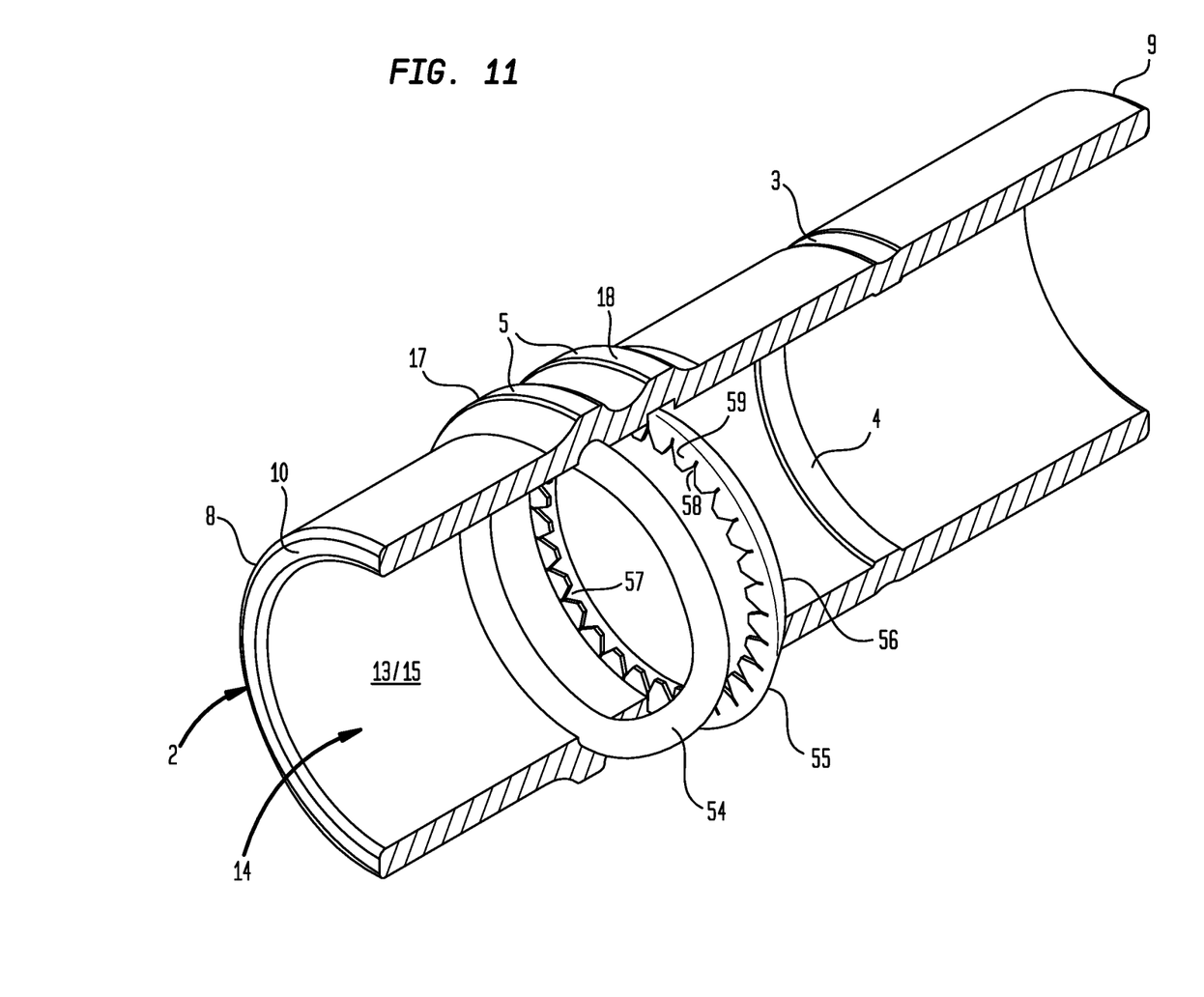
FIG. 11 is a perspective cross sectional view 11-11 of the particular embodiment of the coupler shown in FIG. 1 further including a seal element and an annular retaining member.
Figure 12:
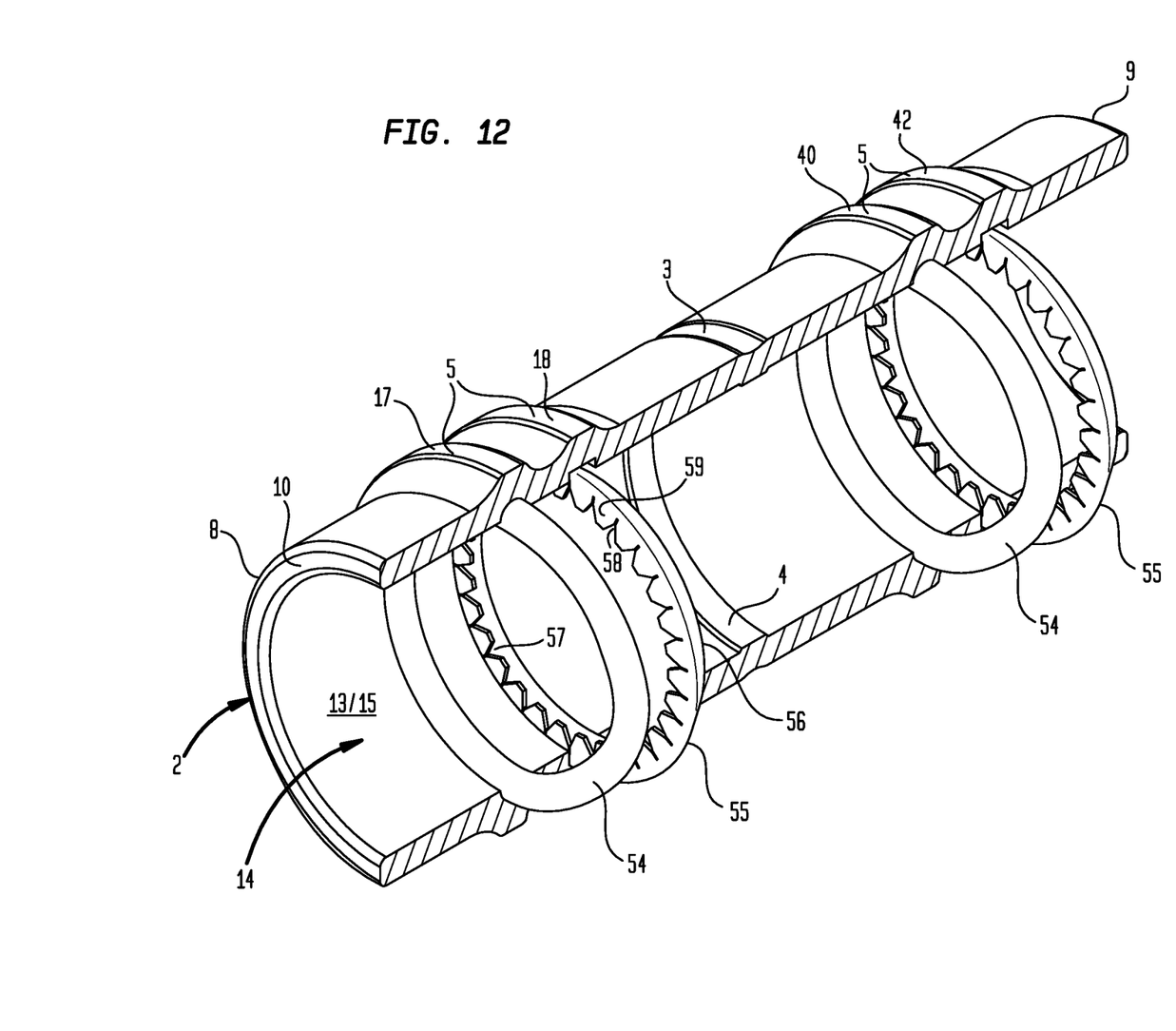
FIG. 12 is a perspective cross sectional view 12-12 of another particular embodiment of a coupler shown in FIG. 7 further including a seal element and an annular retaining member at each of the first end and the second end of the tubular conduit.

Now referring to FIGS. 11 and 12, particular embodiments of the coupler (1) can include a seal element (54) disposed in the first internal annular groove (25). The seal element (54) can be configured to have a portion of the seal element (54) extending outward of the internal surface (13) into the interior passage (14). While the seal element shown in FIGS. 11 and 12 have a circular cross-sectional width; this is not intended to preclude particular embodiments of the seal element having other configurations of the cross-sectional width such as square, rectangular, or oval cross-sectional widths. The seal element (54) can be produced from a material selected from the group including or consisting of: ethylene propylene diene monomer, silicone, fluorocarbon, fluorosilicone, polyurethane, tetrafluoroethylene/propylene, nitrile, and neoprene, or combinations thereof.

Particular embodiments of the coupler (1) can further have an annular retaining member (55). The annular retaining member (55) can have an outer periphery (56) and an inner periphery (57). A plurality of slots can be disposed in circumferentially spaced apart relation about the inner periphery (57) and radially extend from the inner periphery (57) toward the outer periphery (56) to define a plurality of tabs (59). As to particular embodiments the plurality of tabs (59) can be a plurality of resiliently flexible tabs. As to particular embodiments each of the plurality of tabs (59) can taper toward the inner periphery (as shown in the examples of FIGS. 11 and 12). The outer periphery (56) can be disposed in the second internal annular groove (26). The annular retaining member (55) can be produced from a material selected from the group including or consisting of rust-resistant metal, coated metal, metal, rigid plastics, coated rigid plastics, or combinations thereof.

The coupler (1) can be disposed on a pipeline system by matingly engaging a first end of a first pipe to the first end (8) of the tubular conduit (2), and a first end of a second pipe to the second end (9) of the tubular conduit (2). As to particular embodiments (as shown in the example of FIG. 11), the first end of the first pipe may not be coupled in fixed engagement to the coupler (1) by the use of adhesives. Accordingly, the first end of the first pipe can be slidingly inserted into the first end (8) of the tubular conduit (2) to sealably engage the seal element (55) and sufficiently flex the resiliently flexible tabs (60) of the annular retaining member (56) to allow passage through the annular retaining member (56). The resiliently flexible tabs (60) forcibly engage the first end of the first pipe to prevent egress from the annular retaining member. The first end of the second pipe may be compatible with the use of adhesive to couple the second pipe in fixed engagement to the second end (9) of the tubular conduit (2). Accordingly, an amount of adhesive can be disposed on the internal surface (13) of the tubular conduit (2) adjacent the second end (9). Adhesive can also be disposed on the second pipe adjacent the first end and the first end of the second pipe can be slidingly inserted in the coupler second end (9) and to slidingly engage the internal annular member (4). The adhesive can, but need not necessarily, be an adhesive for adhering surfaces of polyvinyl chloride material. As to embodiments of the coupler as show in FIG. 12, the first end of the first pipe and the first end of the second pipe can be slidingly inserted into the first end (8) and the second end (9) of the tubular conduit (2) respectively to sealably engage the seal element (55) and sufficiently flex the resiliently flexible tabs (60) of the annular retaining member (56) to allow passage through the annular retaining member (56). The resiliently flexible tabs (60) forcibly engage the first end of the first pipe and the first end of the second pipe to prevent egress from the annular retaining members at opposed ends of the tubular conduit (2).

As can be easily understood from the foregoing, the basic concepts of the present invention may be embodied in a variety of ways. The invention involves numerous and varied embodiments of a coupler and methods for making and using such couplers including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "coupler" should be understood to encompass disclosure of the act of "coupling"—whether explicitly discussed or not—and, conversely, were there effectively disclosure of the act of "coupling", such a disclosure should be understood to encompass disclosure of a "coupler" and even a "means for coupling." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the couplers herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. A coupler, comprising:
   a tubular conduit including:
   a length disposed between a first end and a second end and a conduit wall having a thickness disposed between an external surface and an internal surface, said internal surface defining an interior passage between said first and second ends;
   an internal annular member circumferentially disposed on said internal surface of said tubular conduit;
   a first external annular member overlaying a first annular groove circumferentially disposed on said internal surface of said tubular conduit; and
   a second external annular member overlaying a second internal annular groove disposed on said internal surface of said tubular conduit,
   said first external annular member overlaying said first internal annular groove disposed a lesser distance from said first end than said second external annular member overlaying said second internal annular groove,
   said first annular groove and said second annular groove each having a depth between said internal surface of said conduit wall and a annular groove bottom surface, said depth of said first annular groove and said second annular groove being less than said thickness of said conduit wall; and
   said internal surface having a constant cross-section in axial direction from said internal annular member and said first annular groove to said second internal annular groove, said internal surface increasing in radial direction from said first annular groove to said first end,
   said tubular conduit formed from a material selected from the group consisting of: polyvinyl chloride, acrylonitrile butadiene styrene, polyethylene, and combinations thereof.

2. The coupler of claim 1, further comprising an external annular groove circumferentially disposed on said external surface of said tubular conduit, said annular groove overlaying said internal annular member circumferentially disposed on said internal surface of said tubular conduit.

3. The coupler of claim 1, wherein said internal surface tapers about 0.01 inches (0.254 millimeters) to about 0.03 inches (0.762 millimeters) between said first end and said first internal annular groove.

4. The coupler of claim 3, wherein said internal surface tapers approaching said internal annular member.

5. The coupler of claim 4, wherein said internal surface tapers about 0.0 inch to about 0.01 inch (0.254 inches) between said second end and said internal annular member.

6. The coupler of claim 5, wherein said conduit wall has a thickness of about 0.15 inches (3.81 millimeters) to about 0.35 inches (8.89 millimeters).

7. The coupler of claim 6, wherein each of said first and second external annular members include a crown disposed between a pair of sides which taper towards said external surface, wherein said crown and said internal annular groove have substantially equal width, wherein said crown has a height of between about 1.0 times and about 2.0 times that of a depth of said internal annular groove.

8. The coupler of claim 7, wherein said first internal annular groove, said second internal annular groove, and said external annular groove each having a depth of about 0.1 inches (2.54 millimeters) to about 0.3 inches (7.62 millimeters).

9. The coupler of claim 8, wherein said length of said tubular conduit is between about 6.5 (165.1 millimeters) inches to about 8.5 inches (215.9 millimeters).

10. The coupler of claim 9, wherein said length of said tubular conduit is selected from the group consisting of: about 6.6 inches to about 6.8 inches, about 6.7 inches to about 6.9 inches, about 6.8 inches to about 7.0 inches, about 6.9 inches to about 7.1 inches, about 7.0 inches to about 7.2 inches, about 7.1 inches to about 7.3 inches, about 7.2 inches to about 7.4 inches, about 7.3 inches to about 7.5 inches, about 7.4 inches to about 7.6 inches, about 7.5 inches to about 7.7 inches, about 7.6 inches to about 7.8 inches, about 7.7 inches to about 7.9 inches, about 7.8 inches to about 8.0 inches, about 7.9 inches to about 8.1 inches, about 8.0 inches to about 8.2 inches, about 8.1 inches to about 8.3 inches, about 8.2 inches to about 8.4 inches, and combinations thereof.

11. The coupler of claim 10, wherein said tubular conduit is produced from a material selected from the group consisting of: polyvinyl chloride, copper, concrete, acrylonitrile butadiene styrene, polyethylene, and combinations thereof.

12. The coupler of claim 11, wherein said tubular conduit has a generally cylindrical internal surface.

13. The coupler of claim 12, wherein said cylindrical internal surface has a diameter of about ½ inch (12.7 millimeters) to about 4½ inches (114.3 millimeters).

14. The coupler of claim 13, wherein said diameter is selected from the group consisting of: about ¾ inch to about 1¼ inches, about 1 inch to about 1½ inches, about 1¼ inches to about 1¾ inches, about 1½ inches to about 2 inches, about 1¾ inches to about 2¼ inches, about 2 inches to about 2½ inches, about 2¼ inches to about 2¾ inches, about 2½ inches to about 3 inches, about 2¾ inches to about 3¼ inches, about 3 inches to about 3½ inches, about 3/14 inches to about 3¾ inches, about 3½ inches to about 4 inches, about 3¾ inches to about 4¼ inches, and combinations thereof.

15. The coupler of claim 14, further comprising a seal element disposed in said first internal annular groove,, wherein a portion of said seal element extending outward of said internal surface into said interior passage.

16. The coupler of claim 15, wherein said seal element comprises a material selected from the group consisting of: ethylene propylene diene monomer, silicone, fluorocarbon, fluorosilicone, polyurethane, tetrafluoroethylene/propylene, nitrile, and neoprene, or combinations thereof.

17. The coupler of claim 16, further comprising an annular retaining member having an outer periphery and an inner periphery, said inner periphery having a plurality of radially extending slots in circumferentially spaced apart relation about said inner periphery defining a plurality of resiliently flexible tabs, said outer periphery disposed in said second internal annular groove.

\* \* \* \* \*